United States Patent
Balaban et al.

(12)

(10) Patent No.: US 10,771,710 B2
(45) Date of Patent: Sep. 8, 2020

(54) SHUTTER ASSEMBLY FOR MANAGING LIGHT RELATIVE TO A PHOTOSENSITIVE DEVICE

(71) Applicant: Raytheon Company, Waltham, MA (US)

(72) Inventors: Scott Balaban, Los Angeles, CA (US); Christopher A. Cox, Torrance, CA (US); Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 8 days.

(21) Appl. No.: 16/167,437

(22) Filed: Oct. 22, 2018

(65) Prior Publication Data

US 2020/0128164 A1    Apr. 23, 2020

(51) Int. Cl.
*H04N 5/238* (2006.01)
*H04N 5/235* (2006.01)
(Continued)

(52) U.S. Cl.
CPC .......... *H04N 5/2353* (2013.01); *G03B 9/22* (2013.01); *H02K 41/0358* (2013.01); *H04N 5/2254* (2013.01)

(58) Field of Classification Search
CPC ...... H04N 5/2353; H04N 5/2254; G03B 9/22; H02K 41/0358
(Continued)

(56) References Cited

U.S. PATENT DOCUMENTS

| 2,793,028 A | 5/1957 | Wheeler |
| 3,252,696 A | 5/1966 | Friedel |

(Continued)

FOREIGN PATENT DOCUMENTS

| DE | 102014002182 A1 | 8/2015 |
| EP | 0469412 A1 | 2/1992 |

(Continued)

OTHER PUBLICATIONS

International Search Report for International Application No. PCT/US2019/047784 dated Nov. 15, 2019, 15 pages.
(Continued)

*Primary Examiner* — Usman A Khan

(57) ABSTRACT

A shutter assembly comprises a base coupled to a photosensor assembly, a flexure device supported by the base, and a shutter arm rotatably coupled to the base via the flexure device. An actuation mechanism is coupled to the shutter arm via the flexure device, and is operable, upon application of an electric field, to rotate the shutter arm from a first position to a second position (or to a third position) to manage light relative to a photosensitive device of the photosensor assembly. Upon rotation of the shutter arm to the second position, the flexure device stores energy such that, upon removal of the electric field, the flexure device releases the stored energy to return the shutter arm to the first position. A keeper magnet can be provided to maintain the shutter arm in the second (actuated) position, so that the electric field can be removed while the keeper magnet maintains a magnetic force to keep the shutter arm in the second position.

21 Claims, 11 Drawing Sheets

(51) Int. Cl.
*G03B 9/22* (2006.01)
*H02K 41/035* (2006.01)
*H04N 5/225* (2006.01)

(58) Field of Classification Search
USPC .............................................................. 348/368
See application file for complete search history.

(56) References Cited

U.S. PATENT DOCUMENTS

| | | | |
|---|---|---|---|
| 3,476,029 | A | 11/1969 | Schreckendgust |
| 3,813,089 | A | 5/1974 | Troeger |
| 3,844,022 | A | 10/1974 | Kutash |
| 4,051,499 | A | 9/1977 | Kondo |
| 4,497,465 | A | 2/1985 | Yeakley et al. |
| 4,592,242 | A | 6/1986 | Kempas |
| 4,692,050 | A | 9/1987 | Kaufman |
| 4,694,703 | A | 9/1987 | Routson |
| 4,802,784 | A | 2/1989 | Brooks |
| 4,812,072 | A | 3/1989 | Brooks |
| 4,850,697 | A | 7/1989 | Schoennauer et al. |
| 4,997,123 | A | 3/1991 | Backus et al. |
| 5,061,107 | A | 10/1991 | Brooks |
| 5,173,728 | A | 12/1992 | Sangregory et al. |
| 5,265,853 | A | 11/1993 | Szirtes |
| 5,335,418 | A | 8/1994 | Krivec |
| 5,498,095 | A | 3/1996 | Krivec |
| 5,620,169 | A | 4/1997 | Payne |
| 5,706,120 | A | 1/1998 | O'Brien et al. |
| 6,146,044 | A | 11/2000 | Calvet |
| 6,157,100 | A | 12/2000 | Mielke |
| 6,479,782 | B1 | 11/2002 | Blackburn |
| 6,666,612 | B2 | 12/2003 | Lorigny et al. |
| 6,896,384 | B2 | 5/2005 | McWhirter et al. |
| 8,147,151 | B2 | 4/2012 | Chou |
| 8,313,255 | B2 | 11/2012 | Viglione et al. |
| 8,333,521 | B2 | 12/2012 | Viglione |
| 8,556,533 | B2 | 10/2013 | Bullard |
| 8,708,593 | B2 | 4/2014 | Stratton |
| 9,671,676 | B2 | 6/2017 | Agapescu |
| 9,798,220 | B2 | 10/2017 | Henry et al. |
| 2005/0189825 | A1 | 9/2005 | Brodt et al. |
| 2007/0008502 | A1 | 1/2007 | Lee et al. |
| 2008/0216286 | A1 | 9/2008 | Bertele et al. |
| 2008/0218109 | A1 | 9/2008 | Komori et al. |
| 2012/0076486 | A1* | 3/2012 | Bai .................. G03B 9/06 396/463 |
| 2012/0321292 | A1* | 12/2012 | Viglione ............ G03B 9/22 396/458 |
| 2013/0308997 | A1 | 11/2013 | Smith |
| 2014/0023428 | A1 | 1/2014 | Kappel et al. |
| 2018/0209475 | A1 | 7/2018 | Balaban et al. |
| 2020/0124086 | A1 | 4/2020 | Bullard et al. |

FOREIGN PATENT DOCUMENTS

| | | |
|---|---|---|
| EP | 0840023 A1 | 5/1998 |
| FR | 2797923 A1 | 3/2001 |
| GB | 1427170 A | 3/1976 |
| WO | WO 2004/061320 A1 | 7/2004 |

OTHER PUBLICATIONS

International Search Report for International Application No. PCT/US2017/062884 dated Jan. 31, 2018, 14 pages.
International Search Report for International Application No. PCT/US2019/047782 dated Nov. 27, 2019, 14 pages.

* cited by examiner

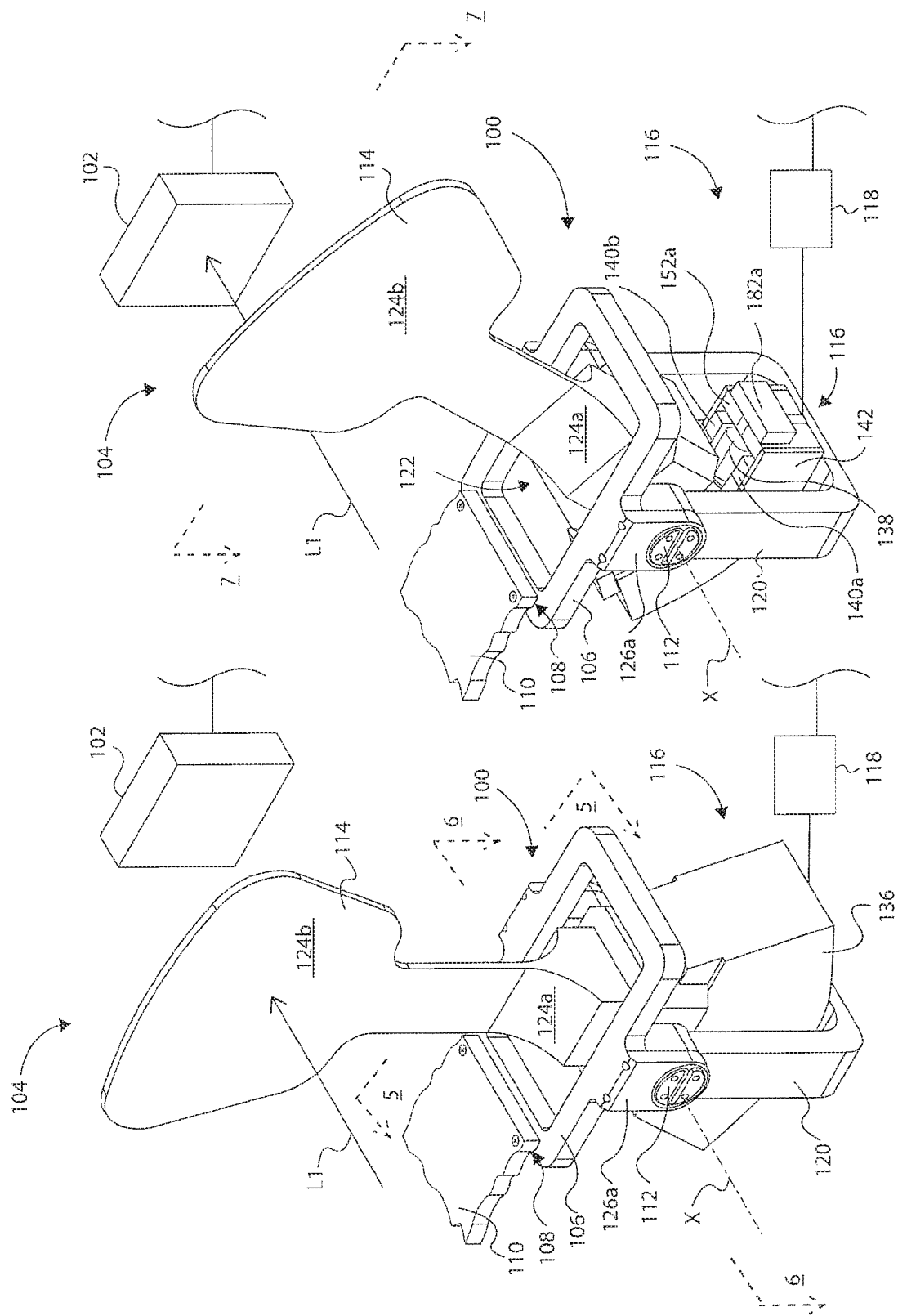

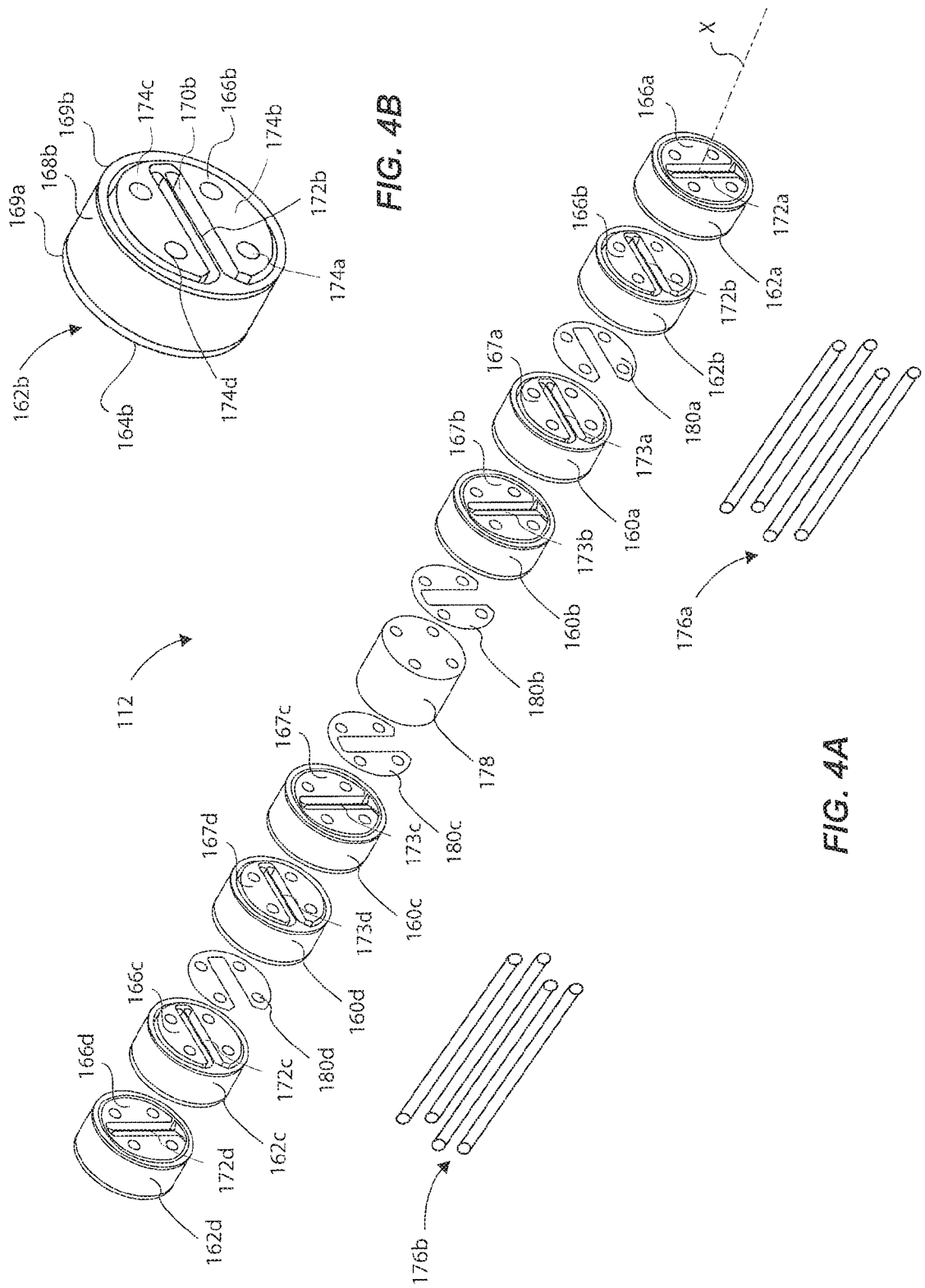

SHUTTER ASSEMBLY FOR MANAGING LIGHT RELATIVE TO A PHOTOSENSITIVE DEVICE

BACKGROUND

In advance or high-performance optical systems, a shutter arm is often provided to stop light (or filter light) relative to a sensor (e.g., CCD, CMOS). One example is a typical twelve-color filter wheel that is rotated about an axis to place one or more filters in a light path relative to one or more sensors. However, the position of the shutter blade must be known and controlled to effectively control an amount of light received by a particular sensor. This requires a number of complex systems that may include position sensors, electronics controllers, processors, feedback loops, brushless DC motors, stepper motors, gearheads, gear trains, etc. Both brushless DC motors and stepper motors require complex drive electronics to commutate or step the motor to achieve the required motion of the shutter arm to control light emitted to the sensor. These components and control electronics are typically very expensive, and in space applications, they must be "space qualified" prior to use, which efforts are costly, cumbersome and time consuming.

Moreover, brushless DC motors and stepper motors are known as "contact" motors, which generate an appreciable amount of debris within systems when operated, which can be problematic to high-performance optical system and sensors.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1A shows an isometric view of a shutter assembly, in a first position, of a photosensor assembly in accordance with an example of the present disclosure;

FIG. 1B shows the shutter assembly of FIG. 1A in a second position;

FIG. 4A shows an exploded view of a flexure device of the shutter assembly of FIG. 1A in accordance with an example;

FIG. 4B shows a flexure unit of the flexure device of FIG. 4A;

DETAILED DESCRIPTION

Figure 2A:
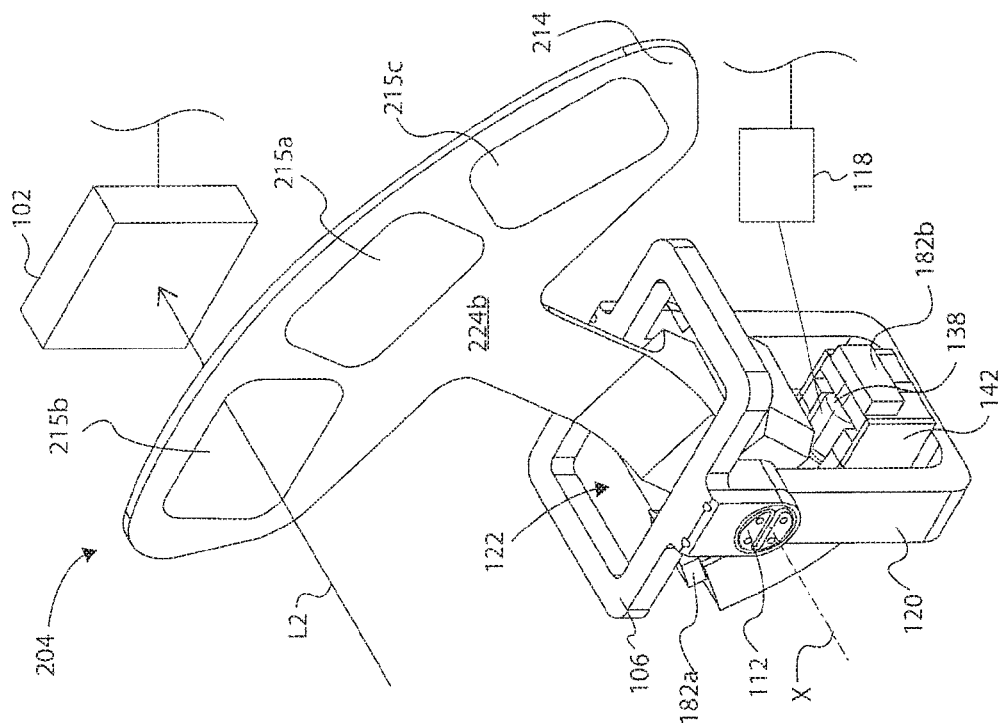
FIG. 2A shows an isometric view of a shutter assembly, in a first position, of a photosensor assembly in accordance with an example of the present disclosure.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a shutter assembly for managing light relative to a photosensitive device, comprising a base comprising an assembly mount interface coupleable to a photosensor assembly; a flexure device supported by the base; a shutter arm rotatably coupled to the base via the flexure device; and an actuation mechanism coupled to the shutter arm via the flexure device. The actuation mechanism is operable, upon application of an electric field, to rotate the shutter arm from a first position to a second position to manage light relative to a photosensitive device of the photosensor assembly operable to receive the light. Upon rotation of the shutter arm to the second position, the flexure device stores energy, and upon removal of the electric field, the flexure device releases the stored energy to return the shutter arm to the first position.

Within the shutter assembly, the actuation mechanism is operable, upon application of an opposite electric field, to rotate the shutter arm from the first position to a third position in an opposite rotational direction from a rotational direction in which the shutter arm is rotated to achieve the second position.

The present disclosure also sets forth a photosensor assembly operable with a shutter assembly, comprising a photosensor platform; a photosensitive device coupled to the photosensor platform; a shutter assembly comprising a base coupled to the photosensor platform; a flexure device supported by the base; a shutter arm rotatably coupled to the base via the flexure device; and an actuation mechanism coupled to the shutter arm via the flexure device. The actuation mechanism is operable, upon application of an electric field, to rotate the shutter arm from a first position to a second position to manage light relative to the photosensitive device. Upon rotation of the shutter arm to the second position, the flexure device stores energy, and upon removal of the electric field, the flexure device releases the stored energy to return the shutter arm to the first position.

Again, the actuation mechanism is operable, upon application of an opposite electric field, to rotate the shutter arm from the first position to a third position in an opposite rotational direction from a rotational direction in which the shutter arm is rotated to achieve the second position.

The present disclosure further sets forth a method for operating a shutter assembly of a photosensitive assembly, the method comprising applying an electric field to an actuation mechanism to move a shutter arm from a first position to a second position, wherein a flexure device, coupled to the actuation mechanism and the shutter arm, stores energy upon the shutter arm moving from the first position to the second position. The method also includes facilitating removal of the electric field from the actuation mechanism, whereby the flexure device releases the stored energy to cause the shutter arm to move back to the first position.

The method further comprises applying an opposite electric field to the actuation mechanism to move the shutter arm from the first position to a third position in an opposite direction from a direction in which the shutter arm is moved to the second position, wherein the flexure device stores energy upon the shutter arm moving from the first position to the third position, and releases the stored energy to facilitate moving of the shutter arm to the first position The present disclosure still further sets forth a method for operating a shutter assembly to manage light relative to a photosensitive device, comprising applying a first electric field to an actuation mechanism to move a shutter arm from a first position to a second position, the shutter arm being maintained in the second position by a keeper magnet coupled to a ferromagnetic component by a magnetic force; facilitating removal of the first electric field from the actuation mechanism, whereby the magnet force maintains the shutter arm in the second position; and applying a second electric field to the actuation mechanism that causes an actuation force that overcomes the magnetic force, wherein upon overcoming the magnetic force, a flexure device operable with the shutter arm releases stored energy to move the shutter arm to the first position.

FIGS. 1A-6 show various aspects of a shutter assembly 100 for controlling an amount of light L1 permitted to reach a photosensitive device 102 of a photosensor assembly 104 (or 204 as in FIGS. 2A and 2B) in accordance with examples of the present disclosure. As an overview, the shutter assembly 100 can comprise a base 106 comprising an assembly mount interface 108 coupled to a support structure 110 of the photosensor assembly 104 (such as an optical assembly of a telescope), The shutter assembly 100 can comprise a flexure device, such as flexure device 112, which is one example of a suitable type of flexure device, supported by the base 106, and a shutter arm 114 that is rotatably coupled to the base 106 via the flexure device 112. The shutter assembly 100 can comprise an actuation mechanism 116 coupled to the shutter arm 114 via the flexure device 112, as detailed below. The actuation mechanism 116 is operable, such as upon application of an electric field from a power source 118, to rotate the shutter arm 114 from a first position (FIG. 1A) to a second position (FIG. 1B) to manage light relative to the photosensitive device 102 (e.g., to obstruct or hinder light at least to some degree or fully in some cases, or to allow light to be received by the photosensitive device 102). Notably, upon rotation of the shutter arm 114 to the second position, the flexure device 112 stores energy, and upon removal of the electric field from the actuation mechanism 116, the flexure device 112 releases the stored energy to return the shutter arm 114 to the first position of FIG. 1A.

The shutter arm 114 can comprise a light-stop blade (e.g., light stop blade 124b) operable to manage a magnitude of the light relative to the photosensitive device 102, Here, "managing a magnitude of light" means completely or substantially preventing any wavelengths of light from being received by the photosensitive device 102, because the light-stop blade 124b is positioned along the light path L1 to stop light from passing through or beyond the light-stop blade 124b. In some examples, the shutter arm 114 can be comprised of a rigid or semi-rigid material that stops light from passing through, such as certain composites, polymers, metals, etc.

Figure 2B:
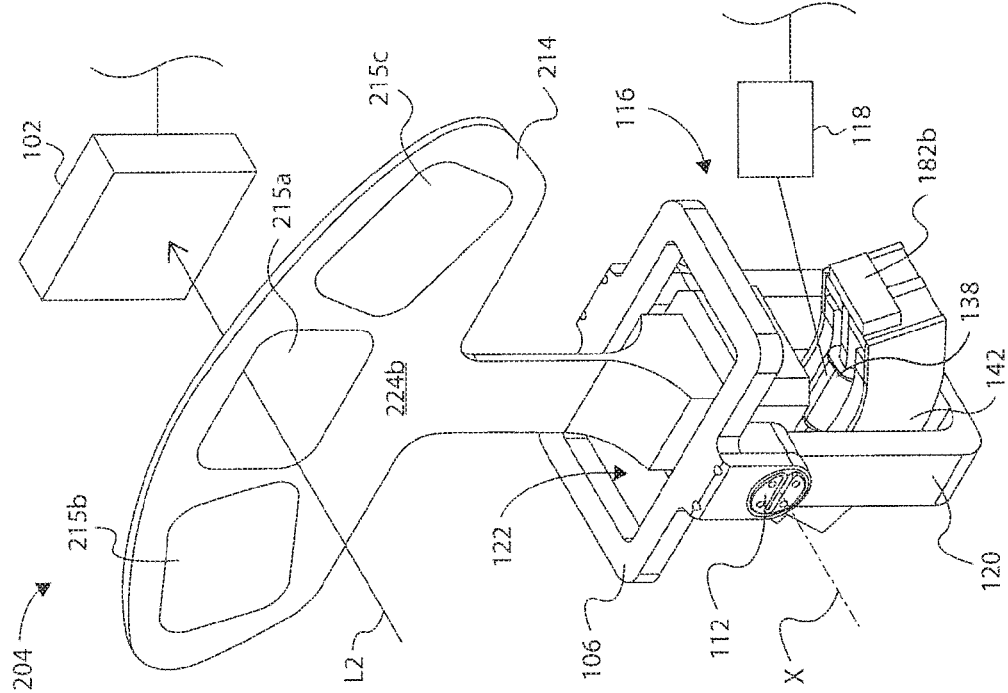
FIG. 2B shows the shutter assembly of FIG. 1A in a second position.

Note that FIGS. 2A and 2B show a shutter assembly 204 having another type of a shutter arm 214 (having light filters, polarized filters, etc.) that can replace the shutter arm 114 of FIGS. 1A and 1B, but all the other components of the shutter assembly 100 of FIGS. 1A and 1B operate the same, and therefore will be discussed and labeled as the same between FIGS. 1A and 1B and FIGS. 2A and 2B. The shutter arm 214 is discussed in detail below.

The base 106 can comprise a coil support base 120 coupled or attached to the base 106, which can be formed as a U-shaped support member. In an alternative example, the base 106 and the coil support base 120 can be formed as a unitary body, instead of two components. The base 106 and the coil support base 120 can be comprised of an aluminum material, or other rigid metal or suitable material. The base 106 can comprise an opening 122 formed generally as a rectangular-shaped opening that facilitates passage of a first end 124a of the shutter arm 114. Opposite the first end 124a, a second end (i.e., the light-stop blade 124b) can transition as a wider portion, as mentioned above.

The base 106 can comprise first and second flexure support portions 126a and 126b opposing each other and extending outwardly from the rectangular portion of the base 106. Each of the first and second flexure support portions 126a and 126b can comprise first and second flexure support openings 128a and 128b that support respective flexure units (FIG. 4A) of the flexure device 112, as detailed below. The shutter assembly 100 can further comprise a transition support block 130 that comprises a flexure support opening 132 that receives and facilitates support of respective flexure units (FIG. 4A) of the flexure device 112 by the transition support block 130, as also detailed below. A first support surface 134a of the transition support block 130 can be coupled or attached to the first end 124a of the shutter arm 112, and an opposing second support surface 134b can be coupled or attached to a housing 136 of the actuation mechanism 116, This can be done using fasteners, adhesives or other coupling devices, mechanisms, systems or methods.

The transition support block 130 can be received or positioned between the first and second flexure support openings 128a and 128b, in a manner such that openings 128a, 128b, and 132 are aligned and concentric along an axis of rotation X defined by the flexure device 112, as detailed below. The transition support block 130, as being coupled to the housing 136, moves or rotates along with the housing 136 about the axis of rotation X when rotated. The transition support block 130 can be fastened to the housing 136 and situated between support flanges 137a and 137b of the housing 136, so that rotation of the housing 136 effectuates rotation of the transition support block 130 and the attached shutter arm 114.

The actuation mechanism 116 can comprise a rotary voice coil device comprising an electrical coil device 138 (FIGS. 1B, 2A and 2B, 3A and 3B, 6, and 7) that can be attached to the coil support base 120, and that is electrically coupled to the power source 118. The actuation mechanism 116 can further comprise at least one curved magnetic component, such as a pair of curved magnets 140a and 140b (FIGS. 1B, 3A and 3B, and 6). The actuation mechanism 116 can further comprise a magnet support chassis or frame 142 coupled or attached to the housing 136 in a curved opening or slot of the housing 136. The magnet support frame 142 can have a curved profile that corresponds to a curved profile of a broad/lower end of the housing 136 that it is received into. The magnet support frame 142 can comprise slots 144a and 144b defined, at least partially, by outer curved walls 146a and 146b and by an inner curved support wall 146c. The magnet support frame 142 can be comprised of a rigid, non-ferromagnetic material, such as aluminum, or other suitable material. The slots 144a and 144b can each support respective curved magnets 140a and 140b (e.g., via adhesive attaching the curved magnets 140a and 140b to the support frame 142).

Note that the power source 118 can simply be a DC power source of an existing electronics assembly of a particular photosensitive assembly. Thus, a separate power supply may not be required with the disclosed system. Although not shown here, it will be appreciated that a computer system and a controller can be electrically and operatively coupled to the power supply 118 for controlling the polarity and voltage/current of the power supplied to the electrical coil device 138.

The electrical coil device 138 can comprise a coil body 148 formed in an oval shape around which a copper wire 149 is wrapped or coiled. The coil body 148 can further comprise a support aperture 150 that can be formed through a central area of the coil body 148, and in a shape that corresponds to the shape of the inner curved support wall 146c. In the example shown, the support aperture 150 can comprise an arc-shape that corresponds to the arc shape of the inner curved support wall 146c. Thus, the electrical coil device 138 can be situated between the curved magnets 140a and 140b, while the inner curved support wall 146c is slidably received through the support aperture 150 of the coil body 148.

Therefore, upon application of an electric field from the power source 118 to the copper wire 149, an electromagnetic field is generated that applies a force normal to the windings of the copper wire 149, which causes the curved magnets 140a and 140b to move in a direction according to polarity of the applied electric field (e.g., positive or negative). Such movement of the curved magnets 140a and 140b causes rotation movement of the magnet support frame 142 and the housing 136 about the axis of rotation X (defined by the flexure device 112), which causes the shutter arm 114 to concurrently rotate a degree of rotation at a 1:1 ratio relative to the degree of rotation of the magnet support frame 142 and the housing 136. For instance, a positive polarity applied to the electrical coil device 138 causes the shutter arm 114 to rotate to the second position shown in FIG. 1B (and 2B), while a negative polarity can cause the shutter arm 114 to rotate from the first position (FIG. 1A) to a third position (not shown) that is in an opposite angular direction relative to the second position of FIG. 1B.

This functionality of moving a shutter arm to a second position or a third position can be useful in applications such as in FIG. 2A, where the shutter arm 214 comprises a light-filter blade 224b that supports or comprises one or more filters 215a-c arranged in an arced array along the light-filter blade 224b. For instance, when the shutter arm 214 is in the first position of FIG. 2A, a first filter 215a (e.g., a red filter) can be positioned in a light path L2 to selectively transmit only certain wavelengths of light that can be received by the photosensitive device 102 (e.g., a CCD, CMOS, or others as know in the art). Accordingly, when rotated to the second position of FIG. 2B (e.g., upon applying a positive polarity), a second filter 215b (e.g., a green filter) can be positioned along the light path L2 to selectively transmit certain wavelengths of light that can be received by the photosensitive device 102. Finally, when rotated to a third position (not shown), upon applying a negative polarity to the copper wire, a third filter 215c (e.g., a blue filter) can be positioned along the light path L2 to selectively transmit certain wavelengths of light that can be received by the photosensitive device 102.

The actuation mechanism 116 is operable to rotate the shutter arm 114 between the first, second and third positions. In one example, but not intending to be limiting to this, the total degree of rotational travel can be approximately 30 degrees (i.e., between the second position to the third position), where the first position (FIG. 1A) is defined as a zero point position, such that the shutter arm 114 (or 214) can be rotated approximately 15 degrees in one direction to the second position (FIG. 1B), or approximately 15 degrees in the opposite direction to the third position. Of course, the total rotational travel may be less than 30 degrees. In addition, rotational travel in one direction may be less than or greater than the rotational travel in the opposite direction. In another example, the shutter arm 114 can be rotated more than 30 degrees, which is achievable because of the incorporation of the rotary voice coil allowing angular travel of the housing 136. Conversely, a linear voice coil is limited to a smaller degree of rotational travel (e.g., 10 degrees or less) because it travels linearly while the shutter arm must rotate angularly. And, an air space or gap in such linear voice coil further limits the amount of angular travel it can effectuate in a given system.

The total degree of rotational travel (e.g., 30 degrees or more) can be defined by the structural aspects of the magnet support frame 142. More specifically, the magnet support frame 142 can comprise first end portions 152a and opposing second end portions 152b separated from each other radially by approximately 30 degrees, in one example. The first and second end portions 152a and 152b can each act to limit rotational movement of the magnet support frame 142, and therefore the rotational movement of the shutter arm 114, That is, the first end portions 152a act as a "stop" to restrict movement of the coil body 148 when the magnet support frame 142 is rotated to the first positon, while the second end portions 152b act as a "stop" to restrict movement of the coil body 148 when the magnet support frame 142 is rotated to the third positon. This is achieved by one side of the coil body 148 impacting/contacting the first end portion 152a when actuated in one radial direction (e.g., the first position of FIG. 2B), thereby stopping or restricting movement of the magnet support frame 142, and consequently of the shutter arm 114. And, then when actuated in the opposite radial direction (e.g., the third position), the other side of the coil body 148 will impact/contact the second end portion 152b, thereby stopping or restricting movement of the magnet support frame 142, and consequently of the shutter arm 114. In this manner, the actuation mechanism 116 can operate like a binary system being either "on or off" as being operable between the first and second positions (or between the first and third positions). This "binary system" provides a reliable shutter assembly in terms of the position of the shutter arm because of the "always known" position of the shutter arm 114 (or 214), as either being in the normal or zero point position of FIG. 1A, or in the "full stop" position of the second or third positions. This can be advantageous with high-precision optical systems that can benefit from a minimal amount of electronics and controls that are needed to know and control a particular (analog) position of a shutter arm, which typically requires slight adjustments to properly position the shutter arm relative to a photosensitive device. This can complicate the system because it requires a number of sensors, controllers, etc. to know the position of the shutter arm, and then to make such adjustments if/when the shutter arm is misaligned.

Incorporating a rotary voice coil in the manner described herein further reduces or prevents an amount of debris within a particular photosensitive or optical assembly, which occurs when using brush or brushless DC motors, stepper motors, etc. to actuate a shutter blade or arm. Prior systems that utilize brushed/brushless motors or stepper motors are subject to an increased amount of particles and debris that enter the system, which can affect proper operation of the system and the photosensitive device.

As indicated above, the shutter assembly can comprise a flexure device. Different types of flexure devices are contemplated as being suitable for use within the shutter assembly. In one example, the flexure device can comprise the specific flexure device 112 illustrated, which is further described in U.S. patent application Ser. No. 16/167,401, filed Oct. 22, 2018 and entitled "Flexure Device,", which is incorporated by reference herein in its entirety. The flexure device 112 can comprise a plurality of inner flexure units 160a-d and a plurality of outer flexure units 162a-d operatively coupled to each other (see specifically FIGS. 4A and 4B). Note that FIG. 4B shows a close-up view of one of the outer flexure unit 162b for purposes of illustration, and as an example of the structure of other flexure units. More specifically, as shown, the outer flexure unit 162b can comprise a primary flexure body 164b and a core body 166b rotatably interfaced to each other. The primary flexure body 164b can comprise an outer ring portion 168b that is recessed about side lip portions 169a and 169b, so that an amount of metallic braze material can be flowed (and cooled) around the outer ring portion 168b for attaching the outer flexure unit 162b to the second support opening 128b of the base 106 (see FIG. 5). Similarly, outer ring portions of the outer flexure unit 162a can be attached/brazed to the second support opening 128b, while the other outer flexure units 162c and 162d located at the opposing end of the flexure device 112 can be attached/brazed to the first support opening 128a of the base 106.

The core body 166b can be situated within a cylindrical area defined by the outer ring portion 168b, and can comprise a slot 170b formed laterally through the core body 166b. The primary flexure body 164b can comprise a flexible member 172b that extends from the outer ring portion 168b inwardly into/through the slot 170b of the core body 166b to provide a bending stiffness against the primary flexure body 164b upon rotation of the primary flexure body 164b relative to the core body 166b, as further detailed below. The core body 166b can further comprise four through-holes 174a-d extending laterally through the primary flexure body 164b and parallel to the axis of rotation X. Each of the other flexure units of the flexure device 112 can comprise similar through-holes, which are all aligned relative to each other along the flexure device 112. Accordingly, a first set of four alignment pins 176a can extend through all the respective through-holes of the core bodies 166a and 166b of the outer flexure units 162a and 162b, and also through the respective through-holes of the core bodies 167a and 167b of the inner flexure units 160a and 160b, which maintains alignment of such core bodies during operation of the flexure device 112. Similarly, a second set of four alignment pins 176b extend through all of the respective through-holes of the core bodies 166c and 166d of the outer flexure units 162c and 162d, and the core bodies 167c and 167d of the inner flexure units 160c and 160d, which maintains alignment of such core bodies during operation of the flexure 112.

A connector member 178 can be situated between inner flexure units 160b and 160c, and can comprise four through-holes that receive ends of the respective first and second alignment pins 176a and 176b, thereby aligning all of the core bodies of all of the flexure units of the flexure device 112. A plurality of braze foil sheets 180a-d can be positioned between adjacent flexure units (and connector member 178) as shown, and can each have through-holes to receive the first and second alignment pins 176a and 176b, and can each have slots aligned with the slots 170a-d of respective, adjacent core bodies 166a-d of the respective flexure units 160a-d and 162a-d. The braze foil sheets 180a-d are provided to attach or join faces of respective core bodies 166a-d to adjacent components, as shown.

As an example of an operation of a flexure unit, with reference to the flexure unit 162b of FIG. 4B, the core body 166b operates to rotate within the outer ring portion 168b approximately half the total angle of rotation of the transition support block 130 due to the bending stiffness provided by the flexible member 172b. For instance, if the total angle of rotation from the first positon (FIG. 1A) to the second position (FIG. 1B) is approximately 15 degrees, then the core body 166b can rotate approximately 7.5 degrees relative to the outer ring portion 168b, thereby storing energy about the flexible member 172b. Similarly, the core body 166a of the outer flexure unit 162a can rotate approximately 7.5 degrees relative to its outer ring portion, thereby storing energy about the flexible member 172a, and the core bodies 166c and 166d of the outer flexure unit 162c and 162d, respectively, can rotate approximately 7.5 degrees relative to their outer ring portions, thereby storing energy about their respective flexible members 172c and 172d. Thus, the combined degree of rotation of the core bodies 166a and 166b is approximately 15 degrees (and the same holds true for outer flexure units 162c and 162d). The flexible members 173a-d of the inner flexure units 160a-d operate similarly, thereby storing energy about the flexible members 173a-d upon rotation of the transition support block 130 (and the housing 136) relative to the base 106 about the axis of rotation X.

Figure 5:
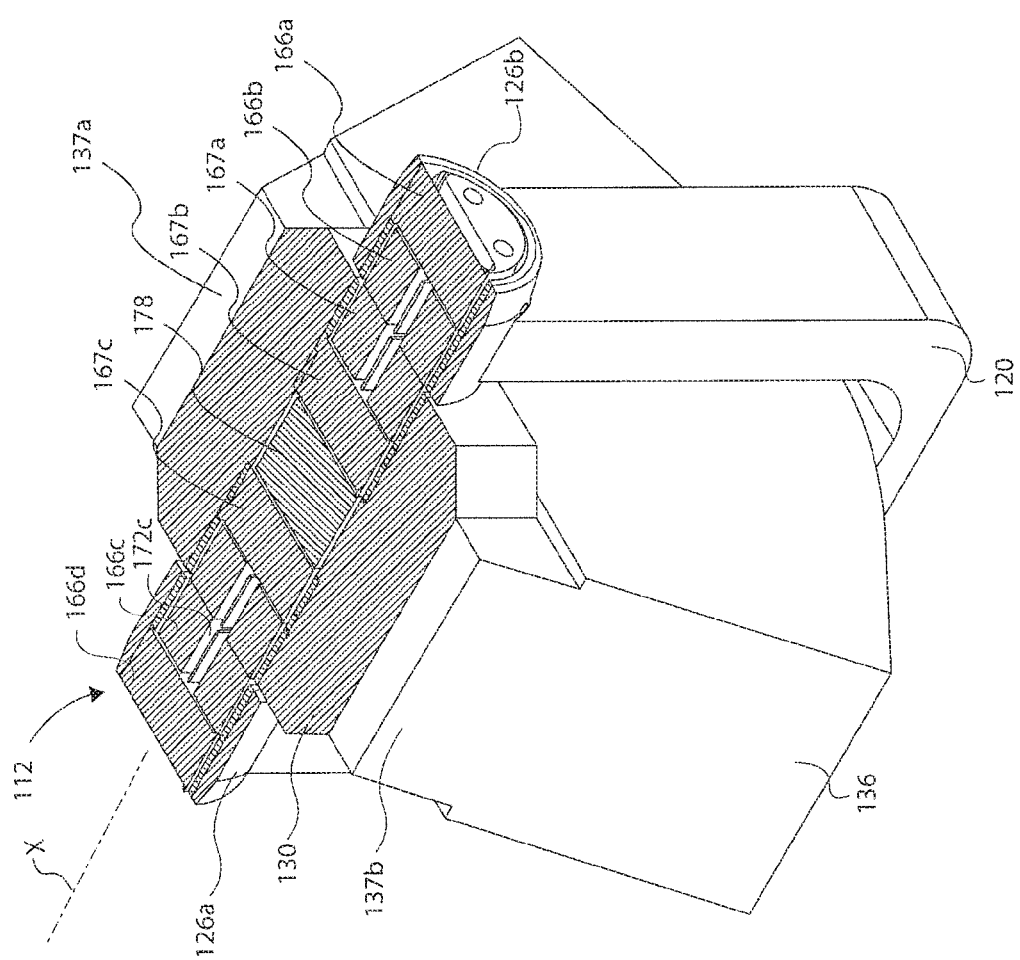
FIG. 5 is a cross sectional view of a portion of the shutter assembly of FIG. 1A, taken along lines 5-5.
Figure 6:
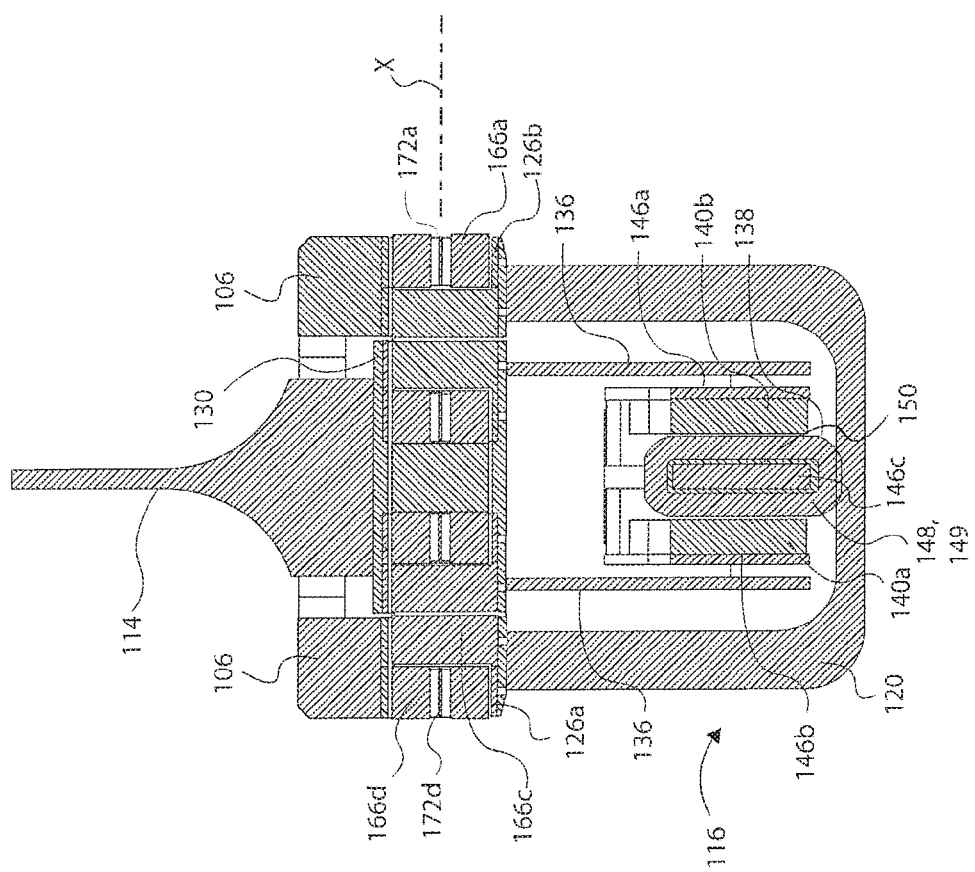
FIG. 6 is a cross sectional view of a portion of the shutter assembly of FIG. 1A, taken along lines 6-6.

The flexible members of some flexure units are situated perpendicular to the flexible members of other flexure units. For instance, the flexible member 172a of the outer flexure unit 162a is situated perpendicular to the flexible member 172b of the adjacent outer flexure unit 162b. And, the flexible member 173a of the inner flexure unit 160a is situated parallel to the flexible member 173b of the outer flexure unit 162b, while being situated perpendicular to the flexible member of the adjacent inner flexure unit 160b. A similar configuration of flexible members is provided on the other side of the connector member 178, See also the cross sectional views of FIGS. 5 and 6, illustrating the positions of the various flexible members 172a-d and 173a-d relative to each other.

Therefore, because the outer ring portions of the inner flexure units 160a-d are attached or fixed to the transition support block 130, and because the outer ring portions of the outer flexure units 162a-d are attached or fixed to the base 106, upon rotation of the transition support block 130 (and the housing 136), the outer ring portions of the inner flexure units 160a-d rotate about the axis of rotation X, while the outer ring portions of the outer flexure units 162a-d remain fixed to the base 106. Meanwhile, the flexible members 172a-d and 173a-d of the flexure device 112 provide an amount of bending stiffness about the flexure device 112, thereby storing energy about the flexure device 112 when the actuation mechanism 116 moves the shutter arm 114 to the second position (e.g., FIG. 1B) (or to the third position discussed above). This stored energy can be released to automatically actuate or move the shutter arm 114 back to the first position, as further detailed above.

Figure 7:
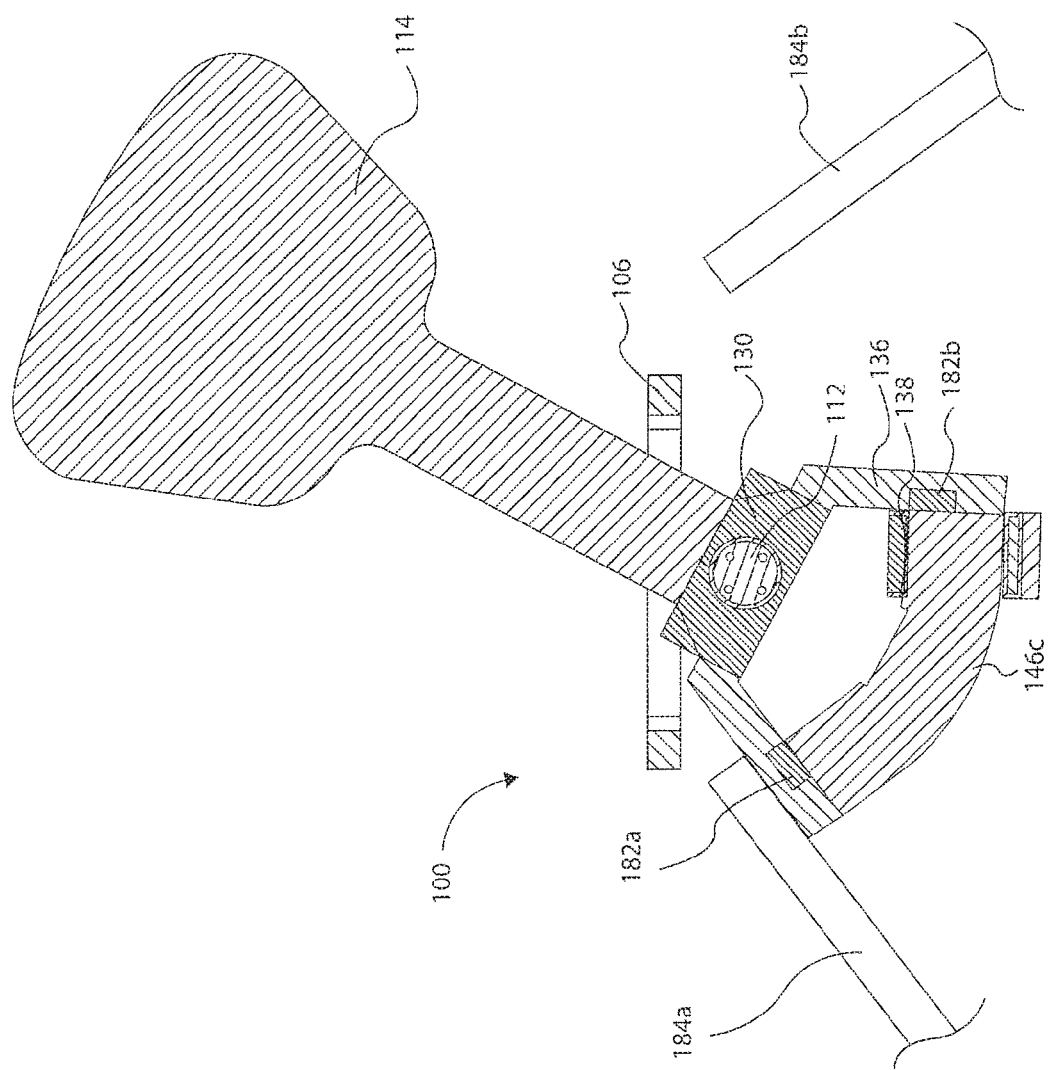
FIG. 7 is a cross sectional view of the shutter assembly of FIG. 1A, taken along lines 7-7, and including ferromagnetic components on either side of the shutter assembly.

As will be further detailed below regarding FIGS. 9A and 10A, other flexure devices could be incorporated with the shutter assembly 100 (and the shutter assembly of FIG. 2A) to facilitate operation of the shutter assembly 100, thereby replacing flexure device 112 described herein, FIG. 7 is a cross-sectional view of the shutter assembly 100 taken along lines 7-7 of FIG. 1B, and illustrates an example of maintaining the shutter arm 114 in the second position with a keeper magnet (and without application of an electric field to the electrical coil device 138). More specifically, a first keeper magnet 182a can be coupled to one outer end of the magnet support frame 142, and a second keeper magnet 182b can be coupled to the other outer end of the magnet support frame 142. The outer end walls of the housing 136 can cover respective first and second keeper magnets 182a and 182b. Alternatively, keeper magnet(s) can be attached to the housing 136.

A first ferromagnetic component 184a, such as a ferromagnetic metal plate or other ferromagnetic structure, can be positioned or otherwise supported proximate the shutter assembly 100 at a location that corresponds to the rotational degree of travel of the housing 136 when actuated and rotated to the second position (FIGS. 1B and 7). Thus, when the housing 136 (and the shutter arm 114) is actuated/rotated to the second position, the keeper magnet 182a can be magnetically attracted to the ferromagnetic component 184a, which generates a magnetic force between the keeper magnet 182a and the ferromagnetic component 184a, This magnetic force can be configured to be strong enough to overcome the potential energy stored in the flexure device 112, so that the flexure device 112 would not be "strong enough" or stiff enough in this second position to overcome the magnetic force between the keeper magnet 182a and the ferromagnetic component 184a. Notably, because of such magnet force maintaining the housing 136 and the shutter arm 114 in the second position, power supply to the electrical coil device 138 can be turned off or removed without the shutter arm 114 automatically returning to the first position by virtue of the stored energy about the flexure device 112. Accordingly, for extended periods of time (days, weeks, etc.), power supply 118 can be entirely eliminated or turned off to the electrical coil device 138, which can dramatically reduce or eliminate power supply requirements of the shutter assembly 100 to maintain a deployed or actuated positon of the shutter arm 114, thereby reducing heat and energy of the assembly 100.

Similarly, when the shutter arm 114 is rotated from the first position (FIG. 1A) to a third position (e.g., opposite direction of the second position), the second keeper magnet 182b can be magnetically attracted to a second ferromagnetic component 184b, which generates a magnetic force that is sufficient to maintain the shutter arm 114 in the third position, so that the power supply can be eliminated or turned off while maintaining the shutter arm 114 in the (actuated/deployed) third position.

Whether the shutter arm 114 is kept in the second or third position by respective keeper magnets 182a and 182b, to effectuate rotation of the shutter arm 114 back to the first position (i.e., zero point of FIG. 1A), an electrical field can be supplied to the electrical coil device 138 that applies an electromagnetic force that is strong enough to actuate/rotate the curved magnets to overcome the magnetic force generated by the respective keeper magnet 182a or 182b. Once the keeper magnet 182a or 182b is "released" from the respective ferromagnetic component 184a or 184b, the flexure device 112 can release its stored energy to exert a rotational force or torque to rotate the shutter arm 114 back to the first position (and the electrical field applied by the power source 118 can be removed so that the shutter arm 114 rests at the zero point of the first position of FIG. 1A). Thus, an electrical field can quickly be applied and removed to/from the electrical coil device 138 to overcome the respective magnetic force generated by the keeper magnets 182a or 182b, as the case may be.

Figure 8A:
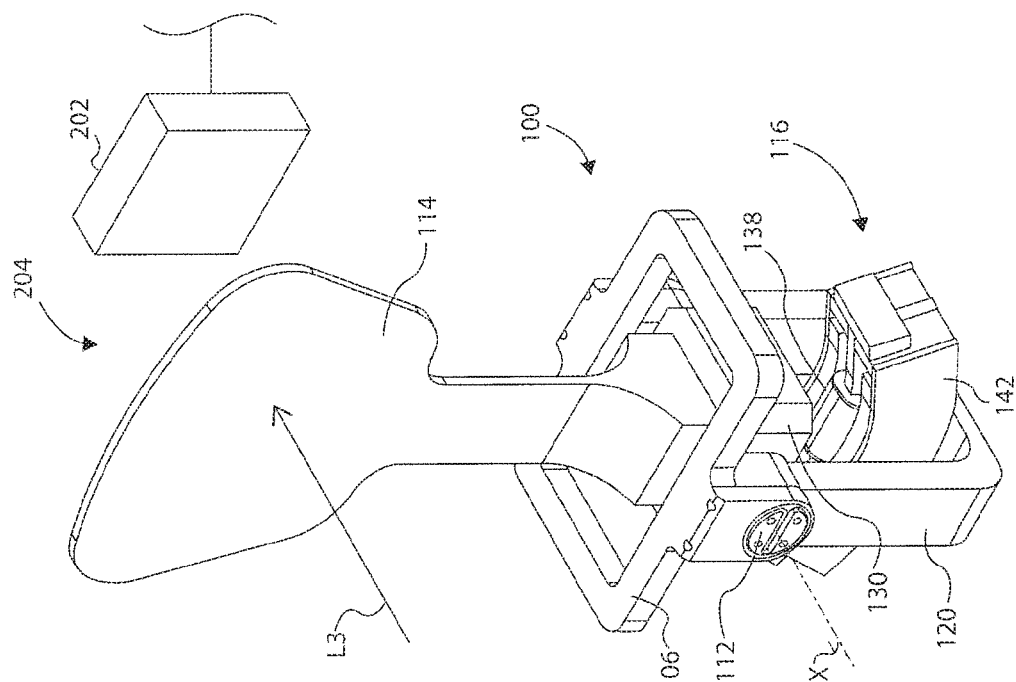
FIG. 8A shows an isometric view of a shutter assembly, in a second position, of a photosensor assembly in accordance with an example of the present disclosure.
Figure 8B:
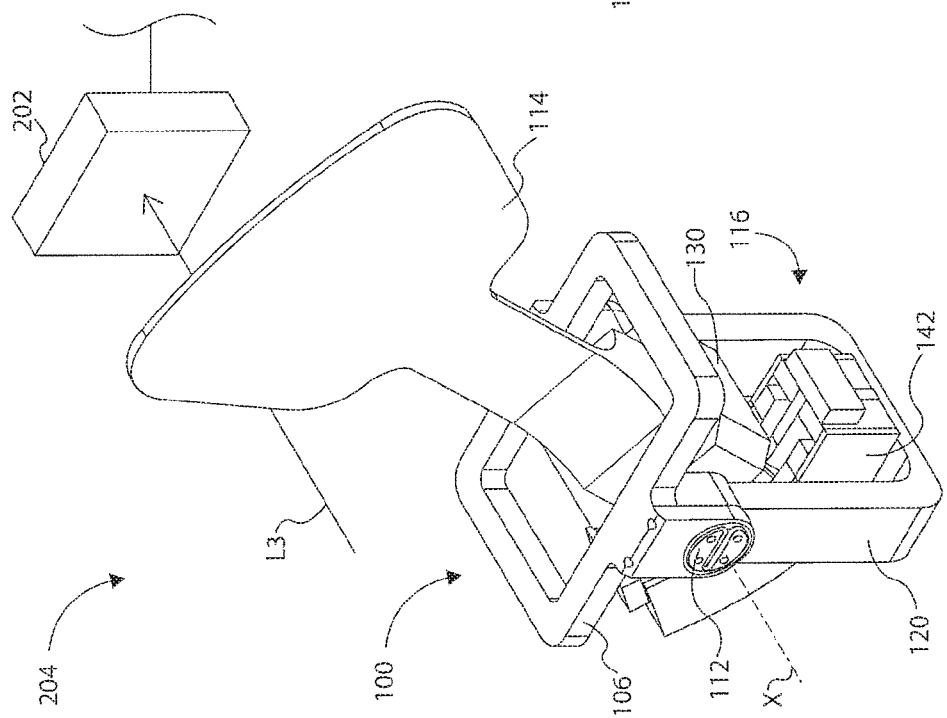
FIG. 8B shows the shutter assembly of FIG. 8A in a first position.

FIGS. 8A and 8B illustrate the shutter assembly 100 for controlling an amount of light L3 permitted to reach a photosensitive device 202 of a photosensor assembly 204 in accordance with an example of the present disclosure. The shutter assembly 100 of FIGS. 8A and 8B is the same assembly as described regarding FIGS. 1A and 1B; however, the difference here is that the photosensor assembly 204 is designed so that the photosensitive device 202 is in a different position as compared to the photosensitive device 102 shown in FIGS. 1A and 1B. In this manner, the shutter arm 114 permits light (i.e., light path L3) to reach the photosensitive device 202 when the shutter arm 114 is in a second (actuated) position (FIG. 8A), which stops or restricts light from reaching the photosensitive device 202 when the shutter arm 114 is (automatically) returned to a first position (FIG. 8B) by virtue of the rotational force or torque applied by the flexure device 112 that releases stored energy, similarly as detailed above. Notably, a continuous electrical field or power can be supplied to the electrical coil device 138 via the power source 118 (see e.g., FIG. 1A) to maintain the shutter arm in the second position, thereby allowing the photosensitive device 202 to receive light. However, upon removal of the electrical field or power supply, the shutter arm 114 automatically returns to the first (zero) position of FIG. 8B to stop light from being received by the photosensitive device 202. As can be appreciated, electrical power is not required to "stop" light from being received by the photosensitive device 202, because the removal or loss of electrical power results in stopping light from being received by the photosensitive device 202.

This particular design can be advantageous in systems that have a photosensitive device that may suffer from damage due to overexposure of light when there is a complete loss of power to the system and/or to the electrical coil device. For instance, a satellite may have a very sensitive (and expensive) telescope system and sensor for capturing images of the earth, other celestial bodies, and/or space. However, a sensor can be damaged if it is pointed directly at or near the sun due to overexposure and thermal damage. In cases where the satellite suffers from complete power failure and begins to drift in space/orbit, the electrical power is thereby removed from the electrical coil device 138. Once this occurs, the flexure device 112 can release stored energy, thereby automatically rotating the shutter arm 114 back to the first position of FIG. 8B to (quickly) cover or shield the photosensitive device 202 from inadvertently being overexposed by the sun or other harmful rays that may be detrimental to the operation of the photosensitive device 202. Thus, the photosensitive system 204 of FIGS. 8A and 8B provides a "fail safe" system to protect a photosensitive device without manual intervention or manual control, because the flexure device 112 automatically places the shutter arm 114 in the light path L3 to stop (harmful) light or thermal energy from passing to the photosensitive device 202.

Those skilled in the art will recognize that, in another example, a second or supplemental shutter arm can be coupled to the flexure device 112 adjacent the existing or primary shutter arm (e.g., 114, or 214), in a manner that the supplemental shutter arm is arranged radially off-set from the primary shutter arm. Thus, the actuation mechanism 116 can be operable to rotate the supplemental shutter arm via the flexure device in a similar manner that the shutter arm is rotated. For instance, movement of the shutter arm to the second position causes movement of the supplemental shutter arm to a different position to manage light relative to a photosensitive device. In this way, a number of filters supported by one or more supplemental shutter arms can be placed along light path(s) to manage light relative to one or more photosensitive devices, much like a color wheel or arc.

In another example, a plurality of shutter assemblies can be arranged in series adjacent each other to manage light relative to one or more photosensitive devices, which can be useful when each shutter arm supports one or more filters to filter light.

Figure 9A:
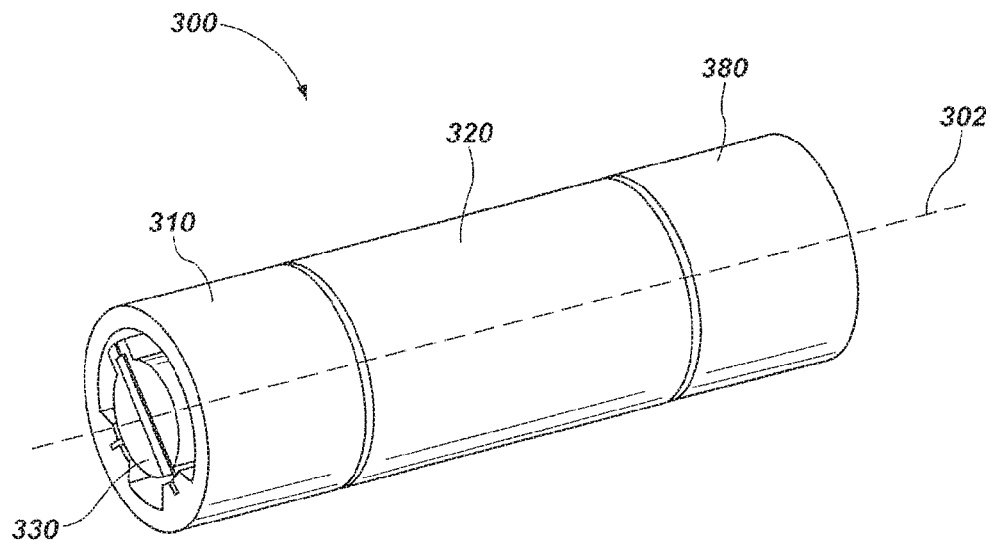
FIG. 9A shows a different type of flexure device that could replace the flexure device of the shutter assemblies associated with FIGS. 1A-8B in accordance with an example of the present invention.
Figure 9B:
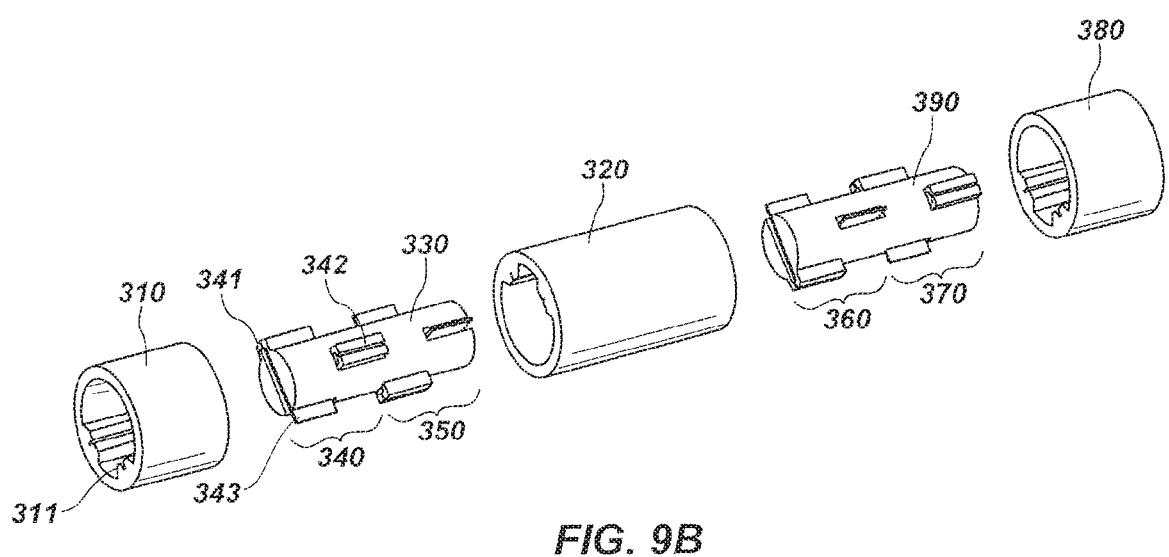
FIG. 9B shows an exploded view of the flexure device of FIG. 9A.

FIGS. 9A-10B illustrate other exemplary types of flexure devices contemplated for use within the shutter assembly disclosed herein, which flexure devices are described in U.S. Pat. No. 8,556,533, which is incorporated by reference herein in its entirety. Specifically, FIGS. 9A and 9B illustrate an example flexure device 300 (e.g., a multi-stage flexural pivot) that can replace the flexure device 112 discussed above, and that can be operable within the shutter assembly as will be appreciated from the following discussion. The flexure device 300 can comprise a coupler 390 rotatable about an axis 302 (e.g., axis X of FIG. 1A) relative to a first support member 310, a second support member 320, and a coupler 330. Additionally, the flexure device 300 can comprise a third support member 380 rotatable about the axis 302 relative to the first support member 310, the second support member 320, the coupler 330, and the coupler 390. The third support member 380 can be rotatably coupled to the second support member 320 via coupler 390 and flexures 360, 370. The additional coupler 390 and the third support member 380 provide two stages of rotation. For example, flexure 340 can be coupled between the first support member 310 and the coupler 330 to form a first stage and flexure 350 can be coupled between the second support member 320 and the coupler 330 to form a second stage. Additionally, flexure 360 can be coupled between the second support member 320 and the coupler 390 to form a third stage and provide for relative rotational movement between the second support member 320 and the coupler 390 about the axis 302. Furthermore, flexure 370 can be coupled between the third support member 380 and the coupler 390 to form a fourth stage and provide for relative rotational movement between the third support member 380 and the coupler 390 about the axis 302. Relative rotational movement between the first support member 310 and the third support member 380 about the axis 302 can be to a degree provided by a sum of the relative rotational movements of the first stage, the second stage, the third stage, and the fourth stage.

Each flexure can have first and second flexible members arranged substantially perpendicular to one another and offset from one another, such as along the axis 102. For example, flexure 340 includes a pair of flexible members 341, 342 and flexure 350 includes a pair of flexible members (not labeled). A support end or free end of each flexible member is interfaced to a slot inside a respective one of the support members (e.g., a support end 343 of flexible member 341 is received in slot 311 of the first support member 310). It should be understood, however, that a flexure can include two or more flexible members, with at least one of the flexible members being substantially perpendicular to at least one other flexible member within the flexure.

Figure 3A:
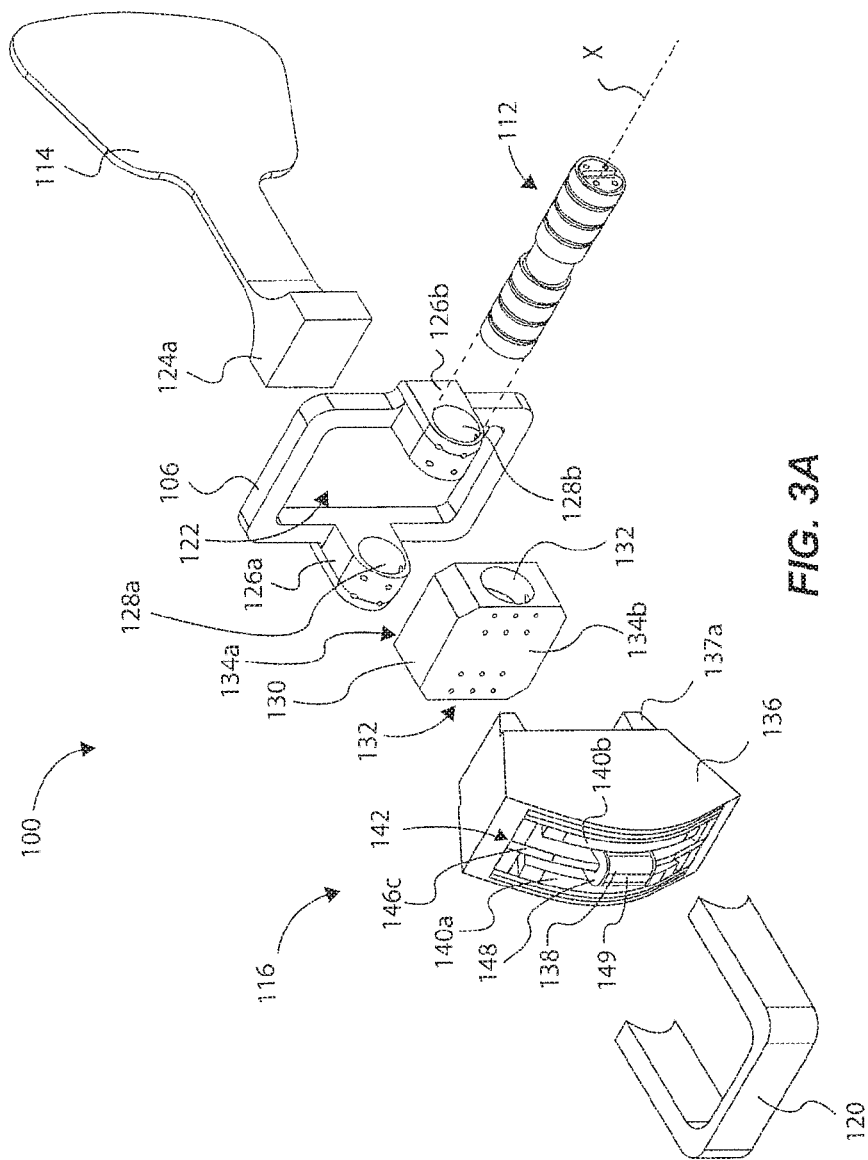
FIG. 3A shows a partially exploded view of the shutter assembly of FIG. 1A.

The outer circumferential surfaces of the first support member 310 and the third support member 380 can be attached (e.g., brazed or via another known way) about the first and second flexure support openings 128a and 128b of the first and second flexure support portions 126a and 126b of the base 106 (see FIGS. 3A and 38). And, the outer circumferential surface of the second support member 320 can be attached (e.g., brazed or via another known way) about the flexure support opening 132 of the transition support block 130. Similarly as described above, actuation of the actuation mechanism 116 causes the transition support block 130 to rotate (e.g., from a first position to a second position), which causes rotation of the second support member 320, which causes rotation of couplers 330 and 390 relative to the first and third support members 310 and 380. Accordingly, energy will be stored about the flexures 340, 350, 360, and 370 when the actuation mechanism 116 rotates the shutter arm 114 to the second position (e.g., FIG. 18). Thus, upon removing an electric field from the actuation mechanism 116, the stored energy is released about the flexures 340, 350, 360, and 370, which causes rotation of the second support member 320 relative to the first and third support members 310 and 380, which causes the base 106 and the shutter arm 114 to rotate back to the first position (FIG. 1A), similarly as described above regarding the various embodiments discussed herein.

Figure 10A:
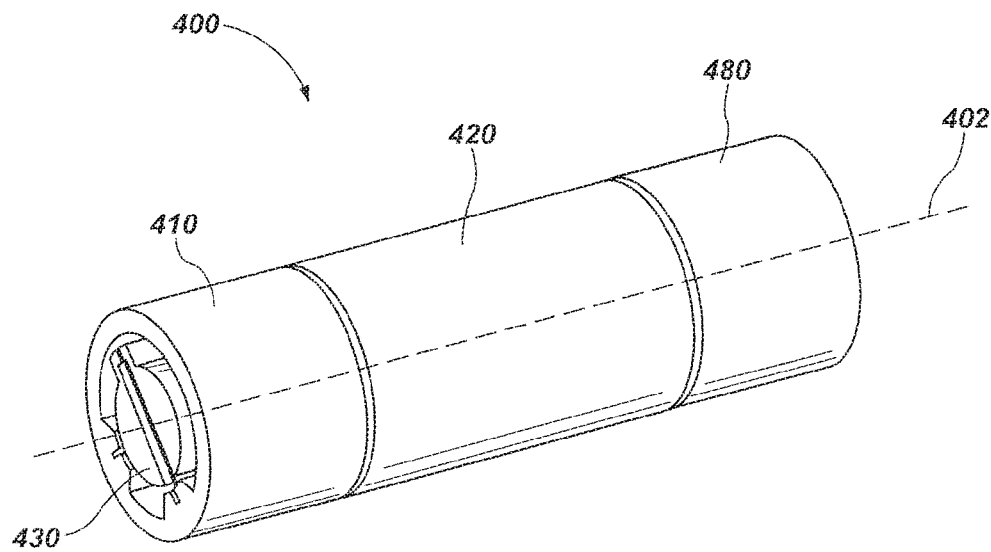
FIG. 10A shows still another type of a flexure device that could replace the flexure device of the shutter assemblies associated with FIGS. 1A-8B in accordance with an example of the present invention.
Figure 10B:
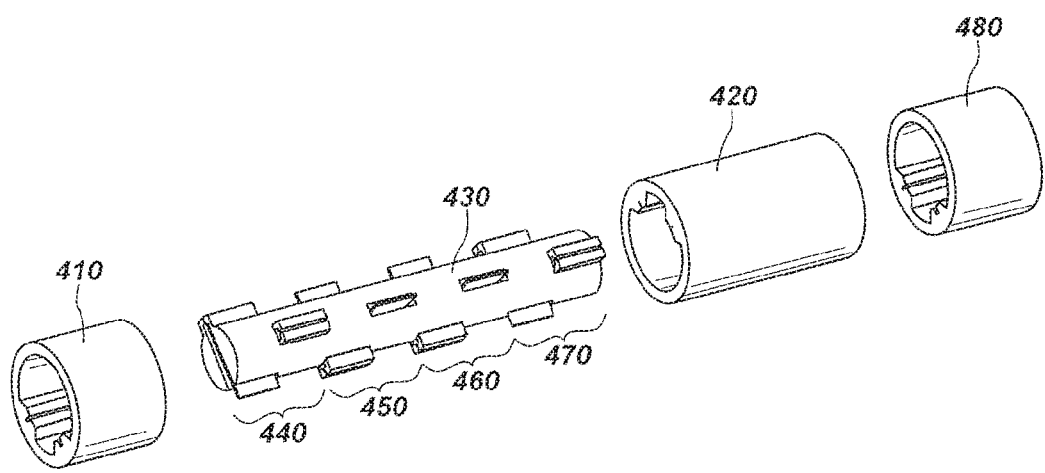
FIG. 10B shows an exploded view of the flexure device of FIG. 10A. Reference will now be made to the exemplary embodiments illustrated, and specific language will be used herein to describe the same. It will nevertheless be understood that no limitation of the scope of the invention is thereby intended.

FIGS. 10A and 108 illustrate still another exemplary flexure device 400 (e.g., a multi-stage flexural pivot) that could replace flexure device 112 discussed herein, as will be appreciated from the following discussion. The flexure device 400 can comprise a third support member 480 rotatable about an axis 402 (e.g., axis X of FIG. 1A) relative to a second support member 420 and a coupler 430. The first support member 410 and the third support member 480 are coupleable to one another to provide for substantially the same rotational movement relative to the second support member 420. For example, flexure 440 can be coupled between the first support member 410 and the coupler 430 to form a first stage and flexures 450, 460 can be coupled between the second support member 420 and the coupler 430 to form a second stage. A flexure 470 can be coupled between the third support member 480 and the coupler 430 to provide for relative rotational movement between the third support member 480 and the coupler 430 about the axis 402. Wth this configuration, the first support member 410 and the third support member 480 can be constrained to move with one another, or in other words, constrained such that there is no relative rotational movement between them.

Figure 3B:
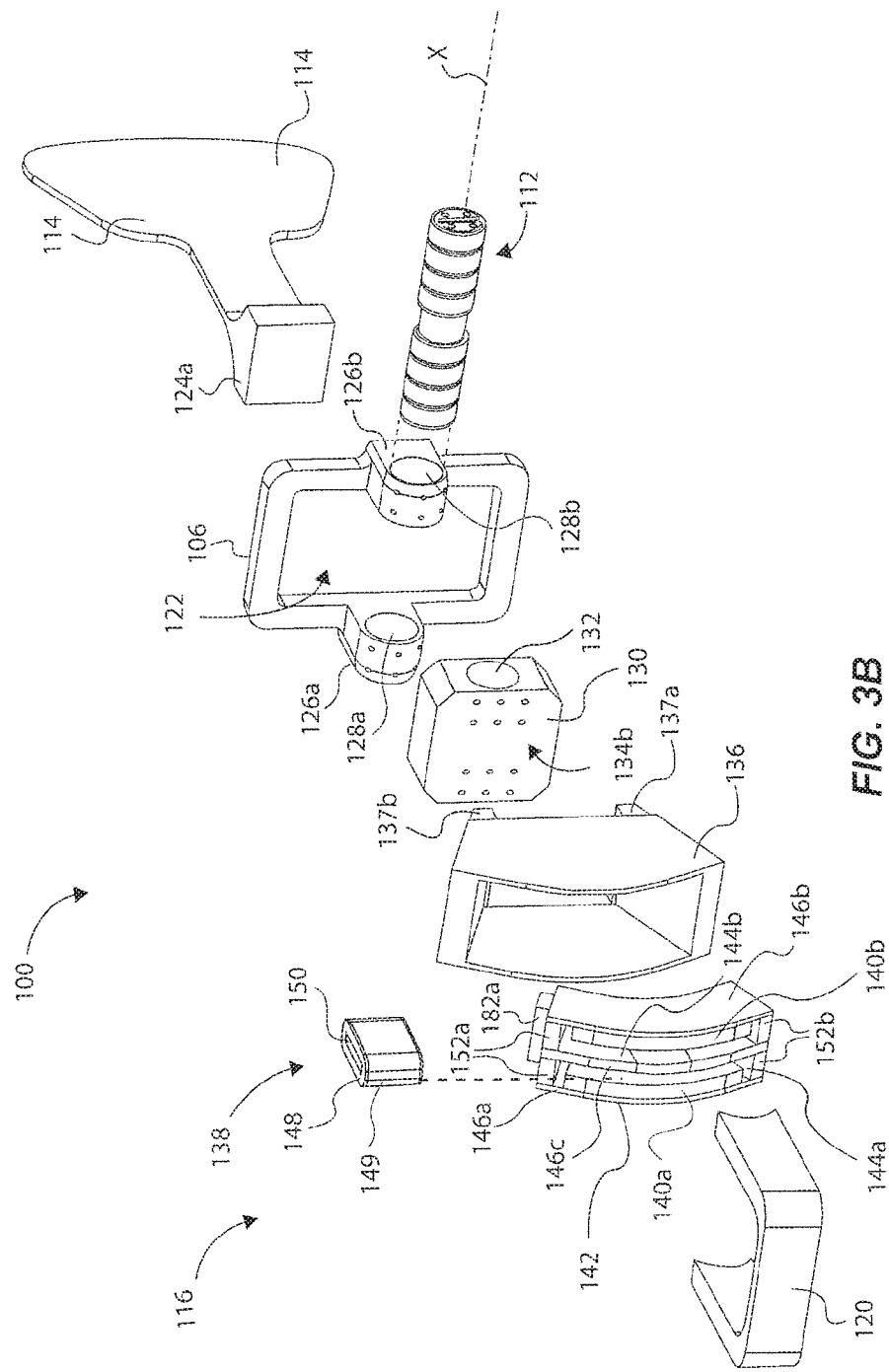
FIG. 3B shows a partially exploded view of the shutter assembly of FIG. 1A.

The outer circumferential surfaces of the first support member 410 and the third support member 480 can be attached (e.g., brazed or via another known way) about the first and second flexure support openings 128a and 128b of the first and second flexure support portions 126a and 126b of the base 106 (see FIGS. 3A and 3B). And, the outer circumferential surface of the second support member 420 can be attached (e.g., brazed or via another known way) about the flexure support opening 132 of the transition support block 130. Similarly as described above, actuation of the actuation mechanism 116 causes the transition support block 130 to rotate (e.g., from a first position to a second position), which causes rotation of the second support member 420, which causes rotation of coupler 430 relative to the first and third support members 410 and 480. Accordingly, energy will be stored about the flexures 440, 450, 460, and 470 when the actuation mechanism 116 rotates the shutter arm 114 to the second position (e.g., FIG. 1B). Thus, upon removing an electric field from the actuation mechanism 116, the stored energy is released about the flexures 440, 450, 460, and 470, which causes rotation of the second support member 420 relative to the first and third support members 410 and 480, which causes the base 106 and the shutter arm 114 to rotate back to the first position (FIG. 1A), similarly as described above regarding the various examples discussed herein.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A shutter assembly for managing light relative to a photosensitive device, comprising:
   a base comprising an assembly mount interface coupleable to a photosensor assembly;
   a flexure device supported by the base, the flexure device having a flexible member;
   a shutter arm rotatably coupled to the base via the flexure device; and
   an actuation mechanism coupled to the shutter arm via the flexure device, the actuation mechanism operable, upon application of an electric field, to rotate the shutter arm from a first position to a second position to manage light relative to a photosensitive device of the photosensor assembly operable to receive the light,
   wherein, upon rotation of the shutter arm to the second position, the flexible member bends and stores energy, and wherein, upon removal of the electric field, the flexible member releases the stored energy to return the shutter arm to the first position.

2. The shutter assembly of claim 1, wherein the actuation mechanism comprises a rotary voice coil device.

3. The shutter assembly of claim 2, wherein the rotary voice coil device comprises:
   an electrical coil device attached to the base and coupleable to a power source;
   a curved magnetic component;
   a magnet support frame coupled to the curved magnetic component; and
   a housing supporting the curved magnetic component and the magnet support frame, the housing coupled to the flexure device,
   wherein the electronic coil mechanism is operable, upon application of the electric field from the power source, to generate an electromagnetic field that causes the curved magnetic component to rotate about an axis of rotation defined by the flexure device, thereby rotating the housing and the shutter arm about the axis of rotation.

4. The shutter assembly of claim 3, further comprising at least one keeper magnet coupled to one of the housing or the magnet support frame, wherein the at least one keeper magnet is magnetically coupleable to a ferromagnetic component when the shutter arm is in the second position to generate a magnetic force that maintains the shutter arm in the second position.

5. The shutter assembly of claim 4, where the at least one keeper magnet comprises first and second keeper magnets, wherein the first keeper magnet is situated about one side of the housing, and the second keeper magnet is situated about an opposing side of the housing, wherein the first keeper magnet maintains the shutter arm in the second position, and wherein the second keeper magnet maintains the shutter arm in a third position.

6. The shutter assembly of claim 1, further comprising a transition support block coupling the housing to the shutter arm, the transition support block rotatable with the housing via the flexure device, the transition support block comprising a flexure support opening coupled to the flexure device, and wherein the base comprises first and second flexure support portions coupled to the flexure device.

7. The shutter assembly of claim 6, wherein the flexure device comprises a plurality of inner flexure units and a plurality of outer flexure units coupled to each other in series, each flexure unit of the inner and outer flexure units comprising a primary flexure body and a core body, the primary flexure body comprising the flexible member situated through a slot of the core body, the flexible member operable to provide a bending stiffness against the primary flexure body upon rotation of the primary flexure body relative to the core body, wherein the primary flexure bodies of the inner flexure units are attached to the flexure support opening of the transition support block, and wherein the primary flexure bodies of the outer flexure units are attached to the first and second flexure support portions of the base.

8. The shutter assembly of claim 7, wherein at least some of the flexible members of the inner and outer flexure units are situated perpendicular to at least some other flexible members.

9. The shutter assembly of claim 1, wherein the actuation mechanism is operable to rotate the shutter arm from the first position to the second position in at least 10 degrees of rotation.

10. The shutter assembly of claim 1, wherein the shutter arm comprises a light-stop blade operable to manage a magnitude of the light relative to the photosensitive device.

11. The shutter assembly of claim 1, wherein the shutter arm comprises a light-filter blade comprising at least one light filter operable to manage a wavelength of the light relative to the photosensitive device.

12. The shutter assembly of claim 1, further comprising a supplemental shutter arm coupled to the flexure device adjacent the shutter arm, wherein the supplemental shutter arm is arranged radially off-set from the shutter arm, wherein the actuation mechanism is operable to rotate the supplemental shutter arm via the flexure device.

13. The shutter assembly of claim 1, wherein the actuation mechanism is operable, upon application of an opposite electric field, to rotate the shutter arm from the first position to a third position in an opposite rotational direction from a rotational direction in which the shutter arm is rotated to achieve the second position.

14. A photosensor assembly operable with a shutter assembly, comprising:
   a photosensor platform;
   a photosensitive device coupled to the photosensor platform;
   a shutter assembly comprising:
      a base coupled to the photosensor platform;
      a flexure device supported by the base, the flexure device having a flexible member;
      a shutter arm rotatably coupled to the base via the flexure device; and
      an actuation mechanism coupled to the shutter arm via the flexure device, the actuation mechanism operable, upon application of an electric field, to rotate the shutter arm from a first position to a second position to manage light relative to the photosensitive device,
   wherein, upon rotation of the shutter arm to the second position, the flexible member bends and stores energy, and wherein, upon removal of the electric field, the flexible member releases the stored energy to return the shutter arm to the first position.

15. The photosensor assembly of claim 14, wherein the actuation mechanism comprises a rotary voice coil device operable to rotate the shutter arm about an axis of rotation defined by the flexure device, and wherein the shutter device comprises a magnet that is magnetically coupleable to a ferromagnetic component of the photosensor assembly when the shutter arm is in the second position to generate a magnetic force that maintains the shutter arm in the second position.

16. The photosensor assembly of claim 14, wherein, when the shutter arm is in the second position with continuous application of the electric field, the shutter arm is operable to permit the light to reach the photosensitive device, wherein upon loss of the electric field, the flexure device causes the shutter arm to automatically move to the first position, thereby preventing the light from reaching the photosensitive device.

17. A method for operating a shutter assembly of a photosensitive assembly, the method comprising:
   applying an electric field to an actuation mechanism to move a shutter arm from a first position to a second position, wherein a flexure device having a flexible member, coupled to the actuation mechanism and the shutter arm, stores energy due to bending of the flexible member upon the shutter arm moving from the first position to the second position; and
   facilitating removal of the electric field from the actuation mechanism, whereby the flexure device releases the stored energy from the flexible member to cause the shutter arm to move back to the first position.

18. The method of claim 17, further comprising applying an opposite electric field to the actuation mechanism to move the shutter arm from the first position to a third position in an opposite direction from a direction in which the shutter arm is moved to the second position, wherein the flexure device stores energy upon the shutter arm moving from the first position to the third position, and releases the stored energy to facilitate moving of the shutter arm to the first position.

19. The method of claim 17, further comprising continuously applying the electric field to maintain the shutter arm to permit the light to reach the photosensitive device, wherein facilitating removal of the electric field comprises unintended loss power supplied to the actuation mechanism, whereby the flexure device causes the shutter arm to automatically move to the first position, thereby preventing the light from reaching the photosensitive device to protect the photosensitive device from damage due to overexposure of light.

20. A method for operating a shutter assembly to manage light relative to a photosensitive device, comprising:
   applying a first electric field to an actuation mechanism to move a shutter arm from a first position to a second position, a flexure device storing energy due to bending of a flexible member upon the shutter arm moving to the second position, the shutter arm being maintained in the second position by a keeper magnet coupled to a ferromagnetic component by a magnetic force;
   facilitating removal of the first electric field from the actuation mechanism, whereby the magnet force maintains the shutter arm in the second position; and
   applying a second electric field to the actuation mechanism that causes an actuation force that overcomes the magnetic force, wherein upon overcoming the magnetic force, the flexure device releasing the stored energy from the flexible member to move the shutter arm to the first position.

21. The method of claim 20, wherein applying the first electric field to an actuation mechanism to move the shutter arm from the first position to the second position comprises rotating the shutter arm and a portion of the actuation mechanism about an axis of rotation defined by the flexure device.

* * * * *